United States Patent [19]

Fry

[11] Patent Number: 4,791,697
[45] Date of Patent: Dec. 20, 1988

[54] WIPER ARM FOR CURVED WINDSHIELD
[75] Inventor: Timothy J. Fry, Spring Valley, Ohio
[73] Assignee: General Motors Corporation, Detroit, Mich.
[21] Appl. No.: 104,159
[22] Filed: Oct. 5, 1987
[51] Int. Cl.$^4$ .............................................. A47L 1/00
[52] U.S. Cl. ................. 15/250.2; 15/250.35; 15/250.38
[58] Field of Search ............ 15/250.2, 250.19, 250.34, 15/250.35, 250.38, 250.39

[56] References Cited
U.S. PATENT DOCUMENTS

| | | | |
|---|---|---|---|
| 2,715,239 | 8/1955 | Mintz | 15/250.2 |
| 3,042,953 | 7/1962 | Batley | 15/250.2 |
| 4,545,088 | 10/1985 | Kohler | 15/250.34 |
| 4,704,761 | 10/1987 | South et al. | 15/250.34 |

FOREIGN PATENT DOCUMENTS 712044 7/1954 United Kingdom ............. 15/250.35

Primary Examiner—Harvey C. Hornsby
Assistant Examiner—J. Dwight Poffenberger
Attorney, Agent, or Firm—Patrick M. Griffin

[57] ABSTRACT

A wiper arm for use with a highly curved windshield is designed so that the wiping pressure in the blade is substantially constant in spite of the deflections up and down to which the arm is subjected. The arm consists of two parts, a channel shaped main body cantilevered from the post of the wiper drive mechanism, and a slider bar that is free at its back end. As the arm deflects, the main body bends, creating a resistance force that adds to the wiping pressure in the blade, while the back end of the slider bar moves relative to the main body of the arm. A tension spring hooked between the back end of the slider bar and the vehicle pulls the arm toward the windshield, also adding to the wiping pressure. However, as the arm deflects up, the spring relaxes, so that the contribution of the spring to wiping pressure decreases concurrently with the contribution of the bending main body of the arm increasing. Therefore, the total wiping pressure remains more nearly constant.

1 Claim, 2 Drawing Sheets

WIPER ARM FOR CURVED WINDSHIELD

This invention relates to vehicle windshield wipers in general, and specifically to a wiper arm for use with a highly curved windshield.

BACKGROUND OF THE INVENTION

Increasing emphasis on higher mileage in vehicles has in turn led to more highly curved and aerodynamic windshields. It is more difficult for the wiper arm to conform as the wiper blade is swept across a highly curved windshield, as compared to a flatter surface. Beyond the conformation problem, there is the problem of the variation in the wiping pressure of the of the wiper blade against the glass. Typically, the wiper arm consists of a base, which is fixed to the oscillating post of the wiper drive mechanism, and a blade mounting portion, which is pivoted to the base. Wiping pressure is exerted on the blade by a long tension spring hooked between the base and the mounting portion. As the arm wipes over the curved windshield surface, it and the blade mounting portion of the arm rise and fall relative to the base. Consequently, the spring will expand and contract, and the wiping pressure varies. A compromise value for the wiping pressure has to be tolerated, higher at some points in the wipe pattern, lower at others. Other, although less common, wiper arms have a one piece design and are cantilevered from the post, or from a base fixed to the post. In cantilevered arms, the wiping pressure results from the deflection of the arm itself relative to the base, rather than from a separate spring. The same problem still exists, however, because the deflection of the arm will also increase and decrease as the arm deflects.

SUMMARY OF THE INVENTION

The invention provides a wiper arm for use with a highly curved windshield with a novel mechanism for producing the wiping pressure in which one component of the total wiping pressure on the blade increases with deflection, while the other component decreases, giving a total wiping pressure that is more nearly constant over the entire wipe pattern.

In the preferred embodiment disclosed, the wiper arm consists of two parts, a channel shaped main body and a slider bar within the main body. The main body of the arm is adapted at its back end to be cantilevered from the oscillating post of the wiper drive mechanism and has a wiper blade mounted at its front end. Therefore, upward deflection of the arm, specifically upward deflection of the main body of the arm, creates a wiping pressure on the blade that increases or decreases in substantially linear fashion, proportional to the deflection. The slider bar is fixed to the main body at its front end, but is free to slide within the main body elsewhere. Therefore, with upward deflection, the back end of the slider bar will slide toward the back end of the main body, and back toward the front of the main body again with downward deflection.

A means is provided that works in cooperation with the moving slider bar to create a component of the total wiping pressure that decreases with increasing arm deflection, and vice versa. In the preferred embodiment disclosed, the specific means used is a tension spring hooked between the back end of the slider bar and the vehicle and stretched so as to pull down on the main body of the arm, thereby contributing to the total wiping pressure. As the back end of the slider bar translates relative to the main body with upward arm deflection, the spring relaxes and its downward pull on the arm decreases. Concurrently with the upward arm deflection, the resistance of the main body to being bent upwardly, its deflection force, increases. The converse occurs when the main body of the arm deflects back down. Therefore, the total wiping pressure, that is, the sum of the spring force and the deflection force, remains more nearly constant over the entire wipe pattern of the arm. In addition, in the embodiment disclosed, a curved ramp on the slider bar is engaged by a spring loaded roller on the main body to help cancel out the component of the force of the tension spring that would act along the main body of the arm, rather than downwardly.

It is, therefore, a general object of the invention to keep the wiping pressure of a vehicle wiper arm constant or nearly constant as it deflects up and down while following a wipe pattern over a highly curved windshield.

It is yet another object of the invention to achieve the nearly constant wiping pressure by means of a two part wiper arm, a cantilevered main body and a slider bar that translates relative to the main body as the main body deflects, and a means associated with the translating slider bar that creates a force that adds to the total wiping pressure, but which decreases as the deflection force of main body increases, and vice versa.

It is still another object of the invention to provide a tension spring hooked between the slider bar and the vehicle to pull down on the arm and contribute to the wiping pressure, so that when the arm deflects up, the slider bar will translate relative to the main body and cause the spring to relax, decreasing its force, while the converse will occur when the arm deflects back down.

DESCRIPTION OF THE PREFERRED EMBODIMENT

These and other objects and features of the invention will appear from the following written description, and from the drawings, in which.

Figure 1:
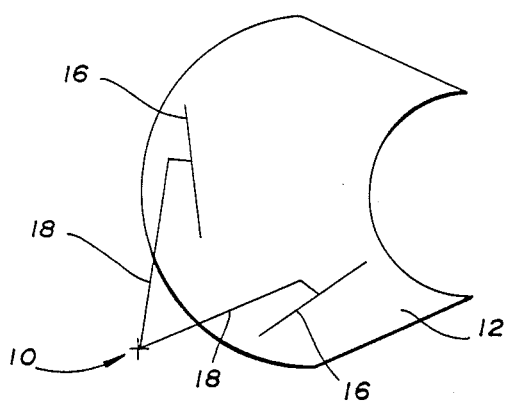
FIG. 1 is a schematic view of a curved windshield incorporating the wiper arm of the invention.
Figure 2:
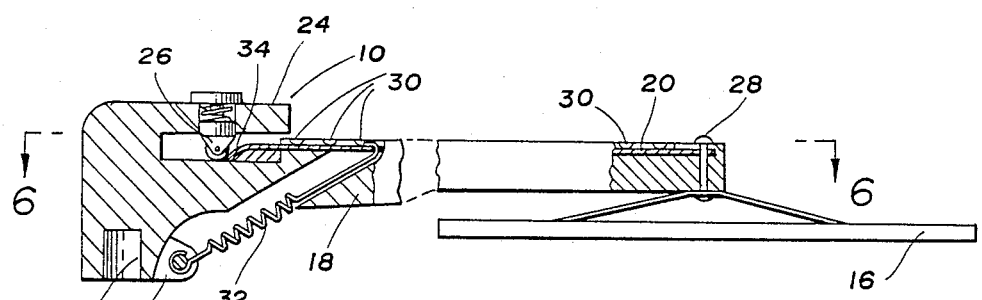
FIG. 2 is a side view of the wiper arm of the invention apart from the vehicle, with part of the main body of the arm broken away to show its relationship to the slider bar.

Referring first to FIGS. 1 and 2, the preferred embodiment of the wiper arm of the invention, two of which are indicated generally at 10, is used in a vehicle of the the type that has a highly curved windshield, indicated at 12. The wiper arms 10 are each attached at a bore 14 to the posts of a conventional drive mechanism, not shown, and are driven through a standard wipe pattern, sweeping conventional blades 16 across the surface of curved windshield 12. It will be understood by those skilled in the art that as wiper arms 10 so oscillate, they will undergo a significant deflection up and down, relative to the point where they are attached to the vehicle, which deflection would normally subject blades 16 to a consequent variation in wiping pressure. The invention provides a novel mechanism to keep the wiping pressure more nearly constant.

Figure 3:
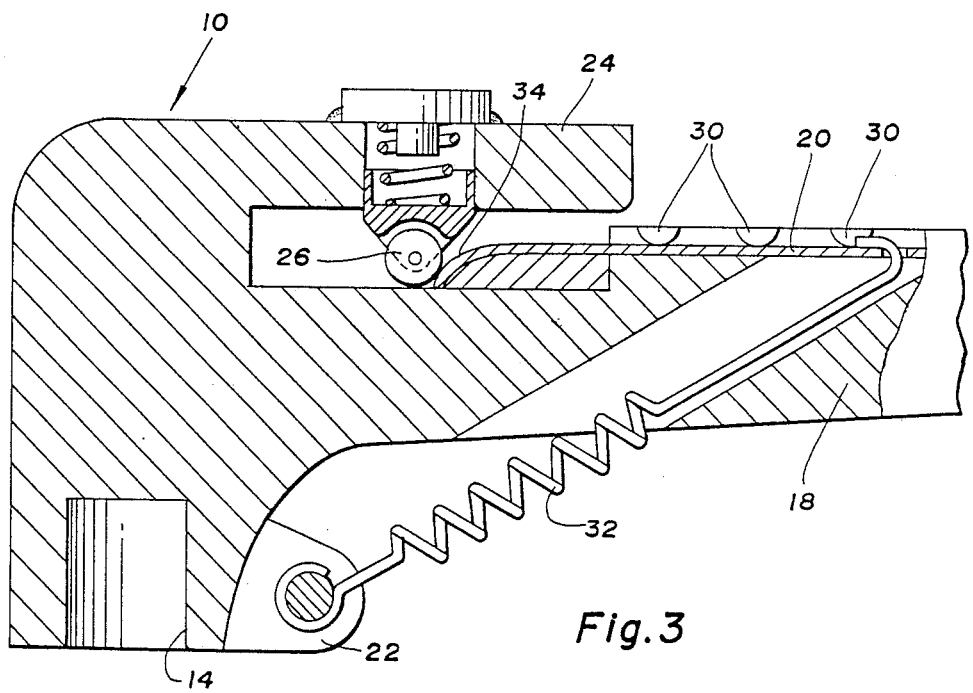
FIG. 3 is an enlarged view of the back end of the arm showing the position of the slider bar relative to the main body of the arm in the undeflected state.
Figure 6:
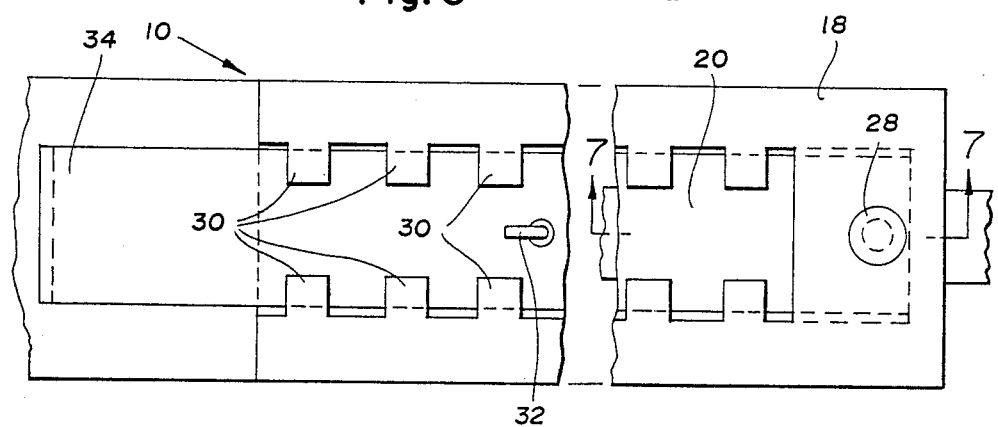
FIG. 6 is a top plan view of the arm from the perspective of line 6—6 of FIG. 2.

Referring next to FIGS. 2, 3 and 6, wiper arm 10 is a two part assembly, including a channel shaped main body 18 which slidably receives a slider bar 20. The main body 18, as best seen on FIG. 6, is generally channel shaped. Main body 18 has an ear 22 at the lower side its back end, and blade 16 is mounted to its front end. In addition, in the embodiment 10 disclosed, the upper side of the back end of the arm main body 18 includes an overhang 24 that extends over and is spaced from the back end of the slider bar 20. Overhang 24 has a spring loaded roller 26 mounted therethrough, which serves a purpose described below. Upward deflection of the arm 10 caused by the blade 16 wiping over the windshield 12 in turn will bend the main body 18 near its back end. The resistance of main body 18 to being bent upwardly creates a downwardly acting force, a force which increases the wiping pressure on blade 16 in substantially linear fashion, at least within the elastic limits of main body 18.

Figure 7:
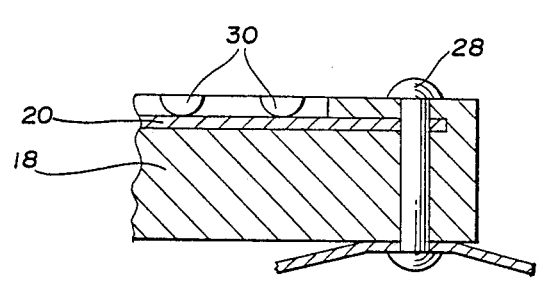
FIG. 7 is a sectional view of the wiper arm taken along the line 7—7 of FIG. 6.

Referring next to FIGS. 3, 6 and 7, slider bar 20 is fixed at its front end to the front end of the main body 18 by a rivet 28 at its front end, but is free to slide back and forth relative to main body 18 underneath of retention tabs 30, as best seen in FIGS. 6 and 7. A tension spring 32 is hooked between the back end of slider bar 20 and ear 22, at an angle such that the greatest component of the force of spring 32 will act normal to the slider bar 20 to pull it and the arm main body 18 to which it is riveted down, toward the windshield 12. Consequently, the spring 32 will add to the wiping pressure on blade 16. Given the angle of spring 32, it will also have a minor force component acting to the left, along the axis of arm 10, rather than downwardly. The minor force component would, to a degree, act to pull up on arm 10, in contravention to the downward pull of spring 32, although the lever arm through which the minor force component could act would be quite short. To help cancel out that small effect, a parabolic curved ramp 34 on the back end of slider bar 20 is engaged by the spring loaded roller 26 at all times. In the undeflected state shown in FIG. 3, spring loaded roller 26 pushes down on ramp 34 at the front thereof. The major component of the downward force of roller 26 on ramp 34 will therefore be to the right along the length of arm 10, acting in opposition to the leftward component of the force of spring 32. In the undeflected state, therefore, the major contribution to the wiping pressure on blade 16 is the downward force component of spring 32. The operation of arm 10 will be described next.

Figure 4:
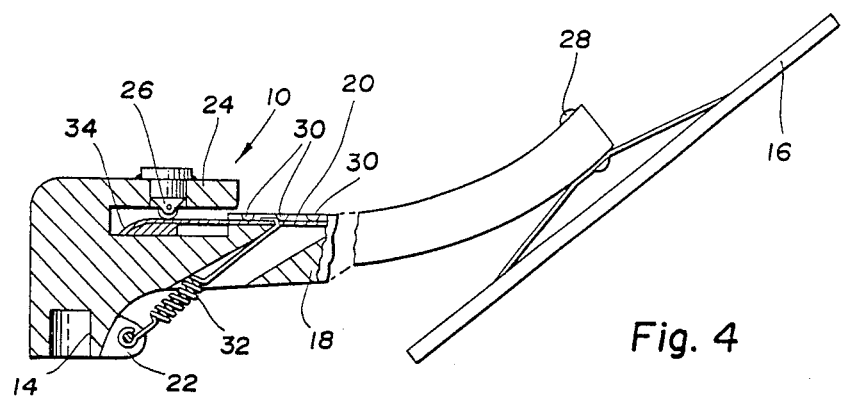
FIG. 4 is similar to FIG. 2, but shows the upwardly deflected condition.
Figure 5:
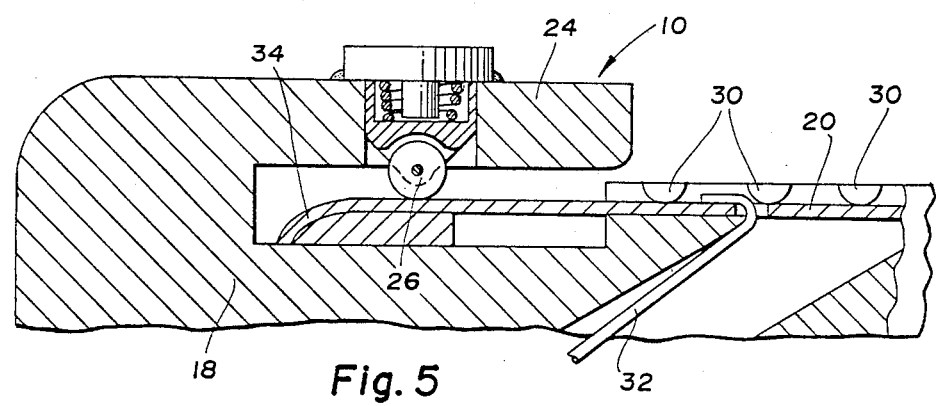
FIG. 5 is similar to FIG. 3, but shows the upwardly deflected condition.

Referring next to FIGS. 4 and 5, with upward deflection of the arm 10 and the consequent bending of the main body 18, the back end of the slider bar 20 slides toward the back end of the main body 18. This sliding action may be analogized to the behavior of a stack of flexible sheets that are bent into a curve while being held together at only one point, such as the pages of a paperback book. The book's binding corresponds to the rivet 28, and the edges of the pages opposite the binding correspond to the back ends of the main body 18 and the slider bar 20. As the book is bent into a curve, the upper sheets will slide relative to the lower sheets. As arm 10 deflects upward and the main body 18 bends into a curve, the slider bar 20 behaves like the upper sheets of the bent book. As slider bar 20 translates relative to main body 18, the point where spring 32 is hooked to arm 10 slides to the left, and spring 32 consequently relaxes and its downward pull decreases. Concurrently, the deflection force in the main body 18, its resistance to bending, increases. The converse will occur with downward deflection, with the back end of slider bar 20 sliding to the right, spring 32 stretching to increase its downward pull, and the deflection and deflection force of the arm main body 18 decreasing. Thus, as the contribution of the slider bar 20 and spring 32 to the wiping pressure decreases with upward deflection, the contribution of the deflection force of the bending arm main body 18 increases, and vice versa. As slider bar spring 32 relaxes, its total force decreases overall, but since its angle changes, the minor component of its force acting to the left along the axis of arm 10 decreases even more. However, the counterbalancing force to that force component provided by roller 26 and ramp 34 will decrease considerably as well, since roller 26 will have ridden up on the curved ramp 34, see FIG. 5. While roller 26 will now push downwardly relatively more on arm 10, its lever arm, measured from bore 14, is considerably less than the lever arm of the spring 32, so it will not greatly affect the wiping pressure on blade 16. The overall result is that the total wiping pressure remains more nearly constant with deflection of arm 10 up and down.

Variations of the preferred embodiment disclosed may be made within the spirit of the invention. The main feature of the invention is the relative sliding movement of the back end of slider bar 20 relative to the arm main body 18 that occurs with up and down deflection of arm 10, which occurs because of the fact that slider bar 20 is fixed at one end to the cantilevered main body 18 and free to slide at the other. Other force producing mechanisms may be devised that would act in cooperation with that relative sliding motion so as to contribute to the total wiping pressure conversely to the contribution of the main body 18 as it bends. With an improvement in magnetic materials, for example, it is conceivable that attracting magnets, one on slider bar 20 and one on arm main body 18, could be arranged so that, as they grew closer, they would pull up with greater force on slider bar 20 and thus counterbalance the tendency of the bending main body 18 to push down on the blade 16. The ramp 34 and spring loaded roller 26 provide a fine tuning to the basic action of the spring 32 by acting to substantially cancel out the effect of the minor component of spring 32. However, the ramp 34 and roller 26 could be eliminated if the basic effect of spring 32 acting in contravention to the bending main body 18 were considered sufficient. Therefore, it will be understood that the invention is not intended to be limited to just the preferred embodiment disclosed.

The embodiments of the invention in which an exclusive property or privilege is claimed are defined as follows:

1. A vehicle wiper arm of the type that is subjected to substantial up and down deflections relative to the vehicle as said arm is driven by a drive mechanism to sweep a wiper blade over the surface of a vehicle windshield, said wiper arm comprising, a main body fixed at the back end to said drive mechanism and mounting said wiper blade at the front end, whereby said main body is flexed up or down as said arm is so driven to create a deflection force that increases the wiping pressure in said blade proportional to said deflection, a slider bar fixed at the front end to said main body, but otherwise free to slide relative to said main body, so that as said main body flexes up or down, the back end of said slider bar will slide relative to said main body, a curved ramp fixed to the back end of said slider bar, a tension spring joined between the back end of said slider bar and said vehicle at such an angle that the major component of the force of said spring acts normal to said slider bar to pull said slider bar and said main body toward said windshield to add to said wiping pressure while the minor component of said spring acts along the length of said slider bar, with said spring relaxing as said slider bar moves relative to said arm main body with upward deflection of said arm and stretching with downward deflection of said arm, and, a spring loaded ball on said arm main body engageable with said curved ramp so as to provide a force acting in opposition to the minor force component of said tension spring, whereby, as said arm deflects up and down, the contribution to wiping pressure of the arm main body will increase as the contribution to wiping pressure of said moving slider bar and the major force component of said tension spring decreases, with the minor force of said tension spring being substantially canceled out by said curved ramp and said spring loaded ball, so that total wiping pressure on said blade will remain more nearly constant.

* * * * *